United States Patent [19]

Arnold

[11] Patent Number: 4,899,999

[45] Date of Patent: Feb. 13, 1990

[54] MACHINE VICE WITH FORCE AMPLIFIER

[75] Inventor: Franz Arnold, Kempten, Fed. Rep. of Germany

[73] Assignee: Fresmak S.A., Zarauz, Spain

[21] Appl. No.: 252,509

[22] Filed: Sep. 30, 1988

[30] Foreign Application Priority Data

Oct. 7, 1987 [DE] Fed. Rep. of Germany ....... 3733849

[51] Int. Cl.$^4$ .............................................. B25B 1/10
[52] U.S. Cl. .................................. 269/240; 269/221
[58] Field of Search ............... 269/240, 221, 224, 245, 269/246, 244

[56] References Cited

U.S. PATENT DOCUMENTS 2,274,428  2/1942  Odin .................................... 269/224
3,902,707  9/1975  Preisenhammer ................... 269/221

Primary Examiner—Judy J. Hartman
Attorney, Agent, or Firm—Flynn, Thiel, Boutell, & Tanis

[57] ABSTRACT

A machine vice with force amplifier comprises a base member (1) with an upwardly open, elongated recess (2), a fixed jaw (4) arranged at one end (1a), which is unitary with the base member (1). A movable jaw (5) is slidably mounted on the base member (1) and bears on its under side a unitary projection extending into the recess (2), with a spindle nut (7). A tightening device (8, 9) is arranged in the recess (2), consisting of a screw spindle (8) with force amplifier engaging in the spindle nut (7), which are adapted to be driven by a common handle (15). On the other end (1a) of the base member (1) a reaction plate (11) is fixed by a plurality of screws (12) on a fixing surface (14) ewxtending perpendicular to the spindle axis (A), against which plate the tightening device (8,9) abuts. The base member (1) comprises a second fixing surface (14a) for the reaction plate (11) at its one end (1a) and corresponding threaded bores (13a) for its screws (12).

6 Claims, 3 Drawing Sheets

MACHINE VICE WITH FORCE AMPLIFIER

FIELD OF THE INVENTION

This invention relates to a machine vice with force amplifier, with a base member of substantially U-shaped cross-section having an upwardly open, elongated recess, with a fixed jaw arranged at one end of the base member, bridging across the recess, with a movable jaw mounted on the base member slidable perpendicular to the fixed jaw and carrying on its underside a projection extending into the recess and having a nut, with a tightening device arranged in the recess, extending in its longitudinal direction, consisting of a screw spindle, with force amplifier, engaging in the nut, which are operable by a common handle, and with a fixed reaction plate fixed at the other end of the base member on a fixing surface extending perpendicular to the spindle axis, by means of a plurality of screws engaging in corresponding threaded bores of the base member, on which plate the tightening device abuts.

BACKGROUND OF THE INVENTION

In a known machine vice with force amplifier of this kind (DE No. A-3 438 900), the fixed jaw is releasably connected to the base member by means of screws. It can be screwed selectively to one of the two longitudinal end regions of the base member. If it is screwed onto the end of the base member facing away from the reaction plate, external gripping of workpieces is possible. For internal gripping of workpieces the fixed jaw is released from the one end of the base member and screwed onto the other end of the base member, at which the reaction plate is also fixed. The movable jaw is for its part also connected by means of screws to a slide guided in the base member, this slide also having the projection with the nut. In order to fix the fixed jaw relative to the base member and the movable jaw relative to the slide, groove-key connections are also provided between the associated parts. Although the producer of this known machine vice recommends that the screws serving for fixing the fixed jaw to the base member and the movable jaw to the slide should be initially tightened with a small torque and then the two jaws should be forced together with maximum tightening and all fixing screws should be tightened up with a higher torque in this pretensioned position, it has been ascertained that the jaws yield by some hundredth of a millimeter in the tightening direction of the machine vice after releasing the screw spindle and renewed tightening of the same under high pressure. Such a yielding is however especially disadvantageous when the machine vice is fitted on NC machine tools, since an alteration of the position of the work piece relative to the base member of around a hundredth of a millimeter arises from the yielding of the jaws. The so called positional accuracy therefore suffers from the yielding of the jaws, especially of the fixed jaw. Furthermore, the production costs in the known machine vice are increased in that the fixed jaw and base member as well as the movable jaw and carriage are each formed in two parts and have to be provided with additional groove-key connections for the accurate mutual fixing of these parts.

There are moreover already known machine vices with force amplifier (DE-A No. 1 933 733), in which the fixed jaw is formed unitarily with the base member and the movable jaw unitarily with the projection. With this machine vice however only an outer gripping of work pieces is possible since the force amplifier can fundamentally act only in one direction.

The invention is based on the problem of providing a machine vice with a force amplifier of the initially mentioned kind which has a particularly highest stability and accordingly also a high positional accuracy, which is simple in construction and which nevertheless makes possible the selective outside gripping and inside gripping.

This is obtained according to the invention in that the fixed jaw is formed unitary with the base member and the movable jaw is formed unitary with the projection and in that the base member has at its one end a second fixing surface for the reaction plate and corresponding threaded bores for its screws, so that the reaction plate with the tightening device abutting thereon can be fixed selectively on one of the ends of the base member.

Through the unitary formation of the fixed jaw with the base member on the one hand and of the movable jaw with the projection on the other hand there arises an extremely high stability of the machine vice. Hereby it is obtained that, with tightening under high pressure the fixed jaw in particular hardly yields at all in the tightening direction, so that the desired high positional accuracy is guaranteed. Moreover the machine vice comprises fewer individual parts and is accordingly cheaper in production. Nevertheless both an outside gripping of workpieces and also an inside gripping of workpieces, such as e.g. hollow bodies, are possible. In the former case the reaction plate is screwed onto the fixing surface of the end of the base member directed away from the fixed jaw. For inside gripping the reaction plate is released from this fixing surface and then the screw spindle is completely screwed out of the spindle nut. The reaction plate can then be screwed, with the whole tensioning device, onto the fixing surface which is at the same end of the base member on which also the fixed jaw is arranged. In both cases a tightening under high pressure is possible, since both in outside gripping and also in inside gripping the moving jaw is moved in each case away from the reaction plate.

Advantageous embodiments of the invention are characterised in the sub claims.

BRIEF DESCRIPTION OF THE DRAWINGS

The invention is explained in more detail below with reference to an embodiment represented in the drawings. These show.

DETAILED DESCRIPTION

Figure 1:
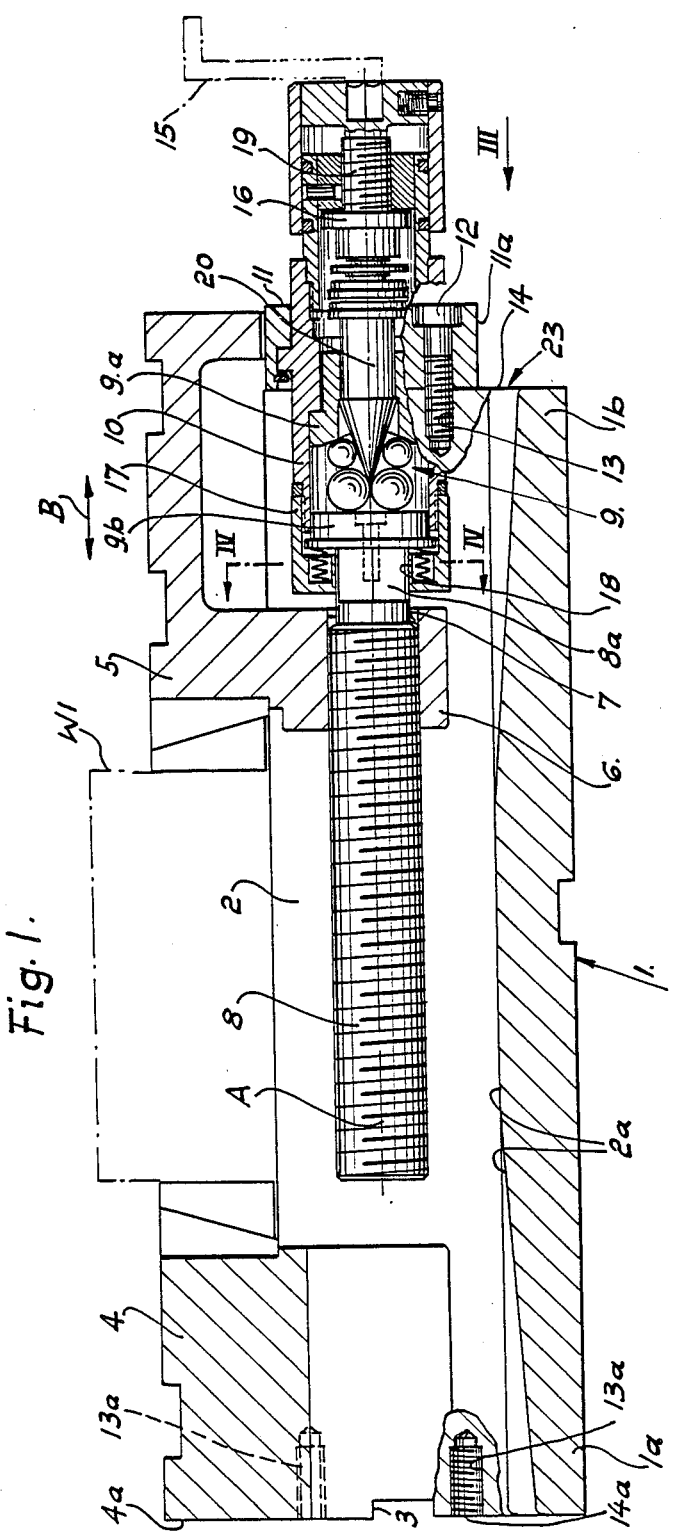
FIG. 1 a longitudinal section of the machine vice for outside gripping.

The base member 1 comprises an upwardly open, elongated recess 2 and is substantially U-shaped in cross section. The recess 2 thus forms the inside space of the U-shaped cross section. On its outside the base member 1 is provided with a plurality of clamping grooves 3. Clamping dogs can engage in these clamping grooves 3, with which the base member 1 is adapted to be fixed on machine tables of machine tools, especially NC machines.

The base member 1 comprises at its one end 1a a fixed jaw 4, which is cast with the base member 1 in one piece. A movable jaw 5 is slidable in the base member 1 perpendicular to the fixed jaw, in direction B. The movable jaw 5 carries a projection 6 engaging in the recess 2 of the base member, in which projection the spindle nut 7 is worked. Also the movable jaw 5 and the projection 6 are cast in one piece.

A screw spindle 8 is arranged in the recess 2, with its axis A extending in the longitudinal direction of the recess 2. The screw spindle 8 engages in the spindle nut 7. On one end 8a of the screw spindle 8 there acts a force amplifier 9, whose thrust part 9a is supported via the sleeve 10 against a reaction plate 11. The reaction plate 11 is adapted to be releasably fixed on a first fixing surface 14 by means of a plurality of screws 12, which engage in threaded bores 13 in the base member 1. This first fixing surface 14 extends perpendicular to the spindle axis A and is provided at the other end 1b of the base member 1 directed away from the fixed jaw 4.

The base member 1 comprises at its one end 1a a second fixing surface 14a and is provided at this end with a plurality of threaded bores 13a, whose size and arrangement corresponds to the threaded bores 13 provided at the other end 1b. The second fixing surface 14a and the threaded bores 13a serve for selective releasable fixing of the reaction plate 11 at the one end 1a of the base member 1, as is shown in FIG. 2.

Figure 4:
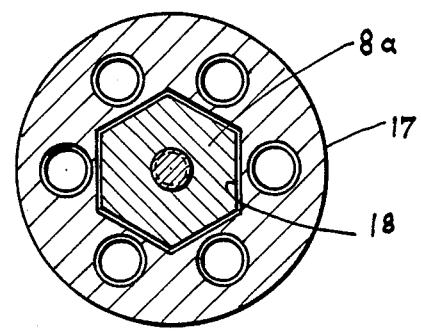
FIG. 4 a partial cross section according to the line IV—IV of FIG. 1.

For external gripping of a workpiece W1 the reaction plate 11, as is shown in FIG. 1, is positioned on the fixing surface 14 provided at the end 1b of the base member 1 and screwed on by means of the screws 12. On rotating the detachable hand crank 15 shown in broken lines the sleeve 10 of the force amplifier 9 is also rotated via the torque coupling 16. The sleeve 10 comprises a cover 17 which, according to FIG. 4, is provided with a hexagonal aperture 18. The one end 8a of the screw spindle 8 has a cross section mating in the hexagonal aperture 18 and is axially slidable in the aperture. Through the sleeve 10 and the cover 17 as well as the interlocking between the aperture 18 and the end 8a the screw spindle 8 is accordingly also rotated to begin with and the movable jaw 5 is hereby brought into position against the workpiece W1. As the clamping pressure increases the torque coupling 16 disengages and the sleeve 10 and also the spindle 8 are not rotated further. With further operation of the handle 16 however, the clamping screw 19 screws into the corresponding thread and thereby presses on the pressure pin 20, which for its part actuates the force amplifier 9. The force amplifier 9 exerts a high pressure on the pressure plate 9b, which is for its part connected to the end 8a of the screw spindle 8. The screw spindle is hereby thrust in the direction towards the fixed jaw 4, whereby the movable jaw 5 is also pressed under high pressure against the workpiece W1.

Figure 2:
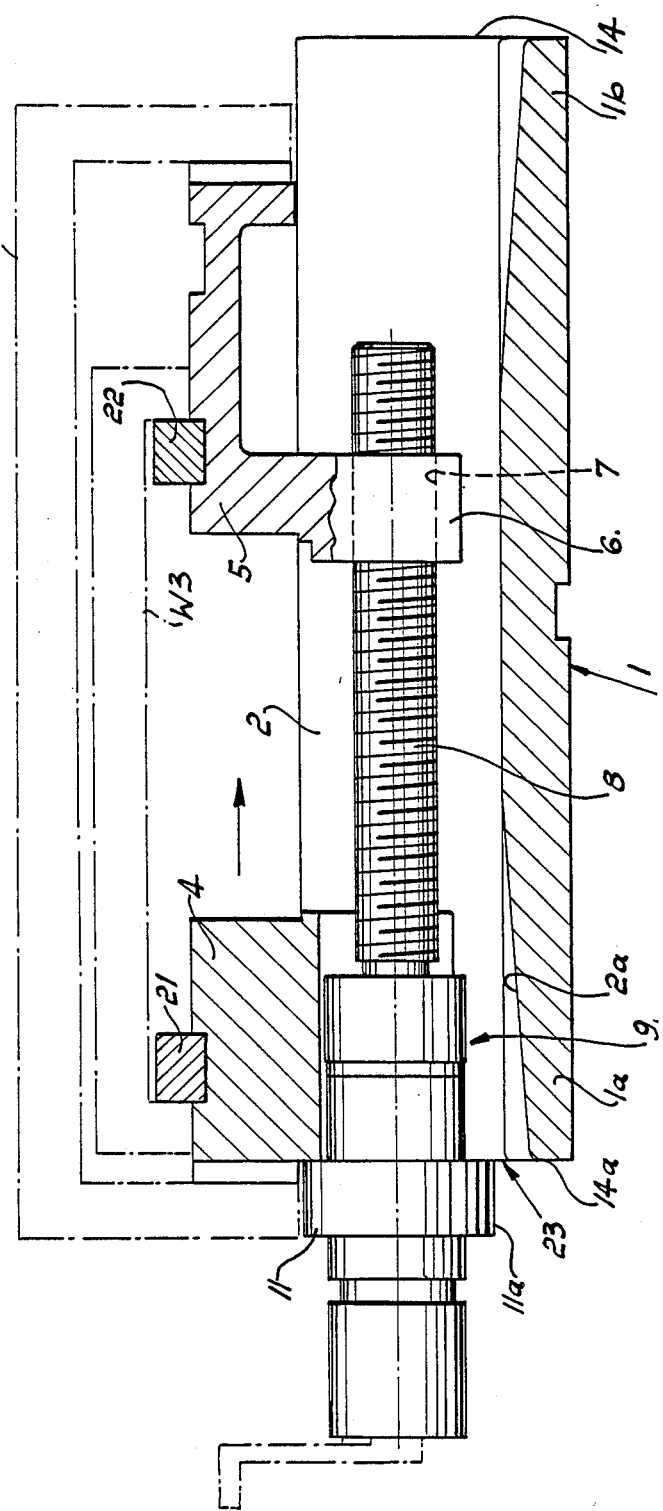
FIG. 2 a longitudinal section of the machine vice for inside gripping.
Figure 3:
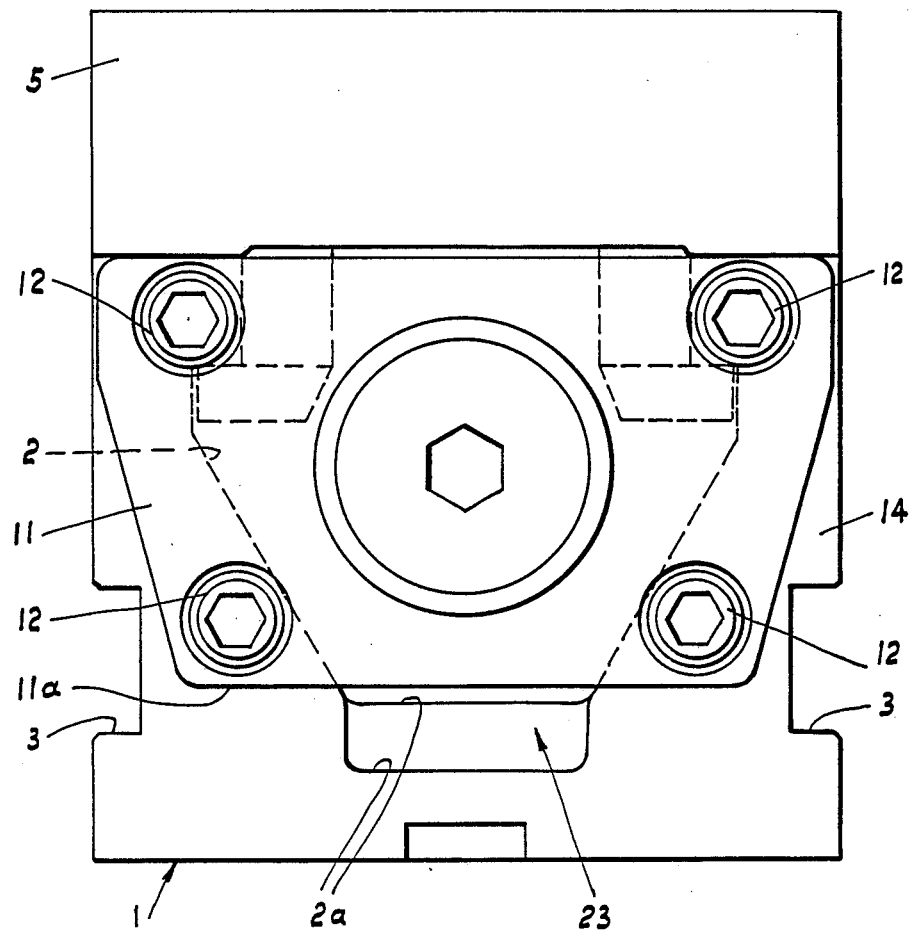
FIG. 3 an end view in the direction III of FIG. 1.

If a workpiece W2 or W3 according to FIG. 2 is to be internally gripped, then the reaction plate 11 is firstly released from the fixing surface 14 and then the spindle 8 is screwed completely out of the spindle nut 7. The reaction plate 11 together with the whole tightening device 8,9,10 and 16-20 is then taken off the side 1b of the base member 1 and fitted on the side 1a, on which the fixed jaw 4 is also arranged. The reaction plate 11 is there brought into position on the second fixing surface 14a and fixed by means of the screws 12, which then engage in the threaded bores 13a. The movable jaw 5 is displaced manually sufficiently for the free end of the screw spindle 8a to be able to engage in the spindle nut 7. The further movement of the movable jaw 5 then takes place in the previously described manner through rotation by means of the hand crank 15. For gripping the workpieces W2 and W3 the hand crank 15 is likewise operated, whereby the sleeve 10 rotates in the previously described manner and the spindle 8 is thereby also entrained until the movable jaw 5 bears against an inner surface of the workpiece W2. In this the movable jaw 5 moves away from the fixed jaw 4. After the disengagement of the torque coupling 16 the high pressure clamping takes place in the previously described manner, wherein the force amplifier 9 thrusts the screw spindle 8 away from the reaction plate 11 in axial direction. Since however in the arrangement shown in FIG. 2 the reaction plate 11 is fixed to the same end 1a of the base member 1 as that at which the fixed jaw 4 is also arranged, the movable jaw 5 is now forced away from the fixed jaw 4 under high pressure. With reference to FIG. 2 it is apparent that the fixed jaw 4 and the movable jaw 5 can be equipped with supplementary jaws 21,22 particularly for inner clamping of another workpiece W3.

In advantageous implementation of the invention the second fixing surface 14a can lie in a common plane with the rear side 4a of the fixed jaw directed away from the movable jaw 5. A particularly large face is thereby created on the base member 1, which is then advantageous when the vice is to be used standing upright. In this case then the large end face of the vice body 1 consisting of the fixing surface 14a and the rear side 4a serve as a standing surface for the machine vice. Also when the machine vice is to be used standing alone no additional head plate is necessary on account of the large end surface.

Advantageously the lower edge 11a of the reaction plate 11 is arranged higher than the bottom 2a of the recess 2. An opening 23 is thereby formed between the lower edge 11a and the bottom 2a, through which swarf and coolant can flow away. Such an outflow is possible on both sides of the base member 1, thanks to this formation, regardless of which end face the reaction plate 11 is directly fixed to.

The through cross section of the opening 23 can be further enlarged in that the bottom 2a of the recess 2 falls away towards the two ends 1a, 1b of the base member 1. The bottom surfaces thereby resulting, obliquely inclined, also favour the outflow of coolant and swarf under force of gravity.

As already briefly mentioned above, the cover 17 fixedly screwed to the sleeve 10 is provided with a hexagonal aperture 18 and the end 8a of the spindle with a mating hexagonal cross section. A particularly simple, robust and wear-resistant coupling is hereby provided between the sleeve 10 and the spindle 8, which on the one hand connects the sleeve 10 through the cover 17 rotation fast with the screw spindle 8, however on the other hand permitting an axial displacement of the screw spindle 8 relative to the sleeve 10 in the high pressure clamping.

I claim:
1. A machine vice with force amplifier means, comprising:
   an elongated base member having a lengthwise extending, substantially U-shaped cross-section with an upwardly open, elongated recess;

a fixed jaw arranged at one end of and being formed in one piece with the base member and bridging across the recess;

a movable jaw mounted on the base member and having guide means thereon for guiding movement of the movable jaw on the base member, said movable jaw being movable along the length of the base member toward and away from the fixed jaw and having formed in one piece therewith on its underside a projection extending into the recess and having a nut therein;

a tightening device arranged in the recess and extending in a longitudinal direction thereof, said tightening device including a screw spindle engaging in the nut and operable, along with the force amplifier means, by a common handle;

a plurality of first threaded bores in a first fixing surface extending perpendicular to the spindle axis and located at an end of the base member remote from the one end thereof, the base member having at said one end a second fixing surface extending perpendicular to the spindle axis and which second fixing surface has a plurality of second threaded bores therein; and a single reaction plate adapted to be releasably fixed to the base member at either one of the first fixing surface or the second fixing surface by means of a plurality of screws engaging the first threaded bores or the second threaded bores, the tightening device and force amplifier means being supported on said reaction plate, whereby the reaction plate can be releasably mounted on a selected one of the ends of the base member by the plurality of screws.

2. The machine vice according to claim 1, wherein the second fixing surface lies in a common plane with a rear side of the fixed jaw facing away from the movable jaw.

3. The machine vice according to claim 1, wherein a lower edge of the reaction plate is arranged higher than a bottom wall of the recess.

4. The machine vice according to claim 3, wherein the bottom wall of the recess falls away towards both ends of the base member.

5. The machine vice according to claim 1, wherein said force amplifier means has a sleeve-like thrust member which is supported rotatably on the reaction plate and rotatable about an axis coaxial with the spindle axis, said thrust member being rotationally fixed with but axially slidable relative to the screw spindle, said sleeve-like thrust member surrounding the force amplifier means and having at its end facing the screw spindle a cover rotationally fixed to the sleeve, the cover being provided with a central, multi-sided aperture through which one end of the screw spindle extends axially slidably, said one end of the screw spindle having a multi-sided cross-section conforming to and mating in the aperture.

6. The machine vice according to claim 5, wherein the aperture and the cross-section of the one end are hexagonal.

* * * * *